United States Patent
Lott

(10) Patent No.: US 11,614,749 B2
(45) Date of Patent: Mar. 28, 2023

(54) ROBOTIC VEHICLE WITH DEFINED PATH AND SAFETY MEASURES

(71) Applicant: Sidis Robotics ApS, Sønderborg (DK)

(72) Inventor: Kenneth Skovbo Lott, Nordborg (DK)

(73) Assignee: engbakken Group's Holding ApS, Marslev (DK)

( * ) Notice: Subject to any disclaimer, the term of this patent is extended or adjusted under 35 U.S.C. 154(b) by 101 days.

(21) Appl. No.: 16/470,620

(22) PCT Filed: Dec. 6, 2017

(86) PCT No.: PCT/EP2017/081727
§ 371 (c)(1),
(2) Date: Jun. 18, 2019

(87) PCT Pub. No.: WO2018/114341
PCT Pub. Date: Jun. 28, 2018

(65) Prior Publication Data
US 2019/0391595 A1    Dec. 26, 2019

(30) Foreign Application Priority Data

Dec. 19, 2016  (DK) .......................... PA 2016 00770

(51) Int. Cl.
G05D 1/02     (2020.01)
G05D 1/00     (2006.01)

(52) U.S. Cl.
CPC ......... *G05D 1/0278* (2013.01); *G05D 1/0055* (2013.01); *G05D 1/0088* (2013.01); *G05D 1/027* (2013.01); *G05D 2201/0208* (2013.01)

(58) Field of Classification Search
CPC .. G05D 1/0278; G05D 1/0055; G05D 1/0088; G05D 1/027; G05D 2201/0208; G05D 2201/0201
See application file for complete search history.

(56) References Cited

U.S. PATENT DOCUMENTS

| | | |
|---|---|---|
| 5,204,814 A | 4/1993 | Noonan et al. |
| 2007/0156286 A1 | 7/2007 | Yamauchi |
| 2011/0022267 A1 | 1/2011 | Murphy |
| 2011/0125358 A1 | 5/2011 | Biber et al. |
| 2011/0231061 A1 | 9/2011 | Reeve et al. |
| 2012/0005831 A1 | 1/2012 | Waters et al. |

(Continued)

FOREIGN PATENT DOCUMENTS

| | | |
|---|---|---|
| CN | 103760908 A | 4/2014 |
| WO | 2005/119386 A1 | 12/2005 |
| WO | WO2016131127 A1 | 8/2016 |

OTHER PUBLICATIONS

International Search Report For Serial No. PCT/EP2017/081727 dated Mar. 4, 2018.

(Continued)

*Primary Examiner* — Anshul Sood
(74) *Attorney, Agent, or Firm* — McCormick, Paulding & Huber PLLC

(57) ABSTRACT

The present invention relates to a robotic vehicle operated to move along a path, where the vehicle could be for mowing the lawn or for agricultural purposes having an operational part operating on an irregular surface. The control of the vehicle includes safety means to check that the vehicle seems to have left its path unintended.

19 Claims, 5 Drawing Sheets

(56) References Cited

U.S. PATENT DOCUMENTS

| | | | |
|---|---|---|---|
| 2012/0174445 A1 | 7/2012 | Jones et al. | |
| 2012/0265391 A1* | 10/2012 | Letsky | G05D 1/0088 |
| | | | 701/25 |
| 2016/0334796 A1 | 11/2016 | Inoue et al. | |
| 2017/0123434 A1* | 5/2017 | Urano | B60W 40/10 |
| 2018/0170307 A1* | 6/2018 | Boran | B60R 21/01554 |

OTHER PUBLICATIONS

J Anonymous: "An introduction to Functional Safety and IEC 61508", Mar. 31, 2002, XP055459493.

European Patent Office Examination Report corresponding to European Patent Application No. 17821825.1 dated Jul. 7, 2021.

Samuel J.O. Corpe et al: "GPS-guded modular design mobile robot platform for agricultural applications", 2013 Seventh International Conference on Sensing Technology (ICST), Dec. 1, 2013 (Dec. 1, 2013), pp. 806-810, XP055459460, DOI: 10.1109/ICSensT.2013.6727763 ISBN: 978-1-4673-5220-8 the whole document.

Written Opinion for PCT Application Serial No. PCT/EP2017/081727 dated Mar. 4, 2018.

First Technical Examination corresponding to Danish Patent Application Serial No. PA 2016 00770, dated Jun. 21, 2017.

* cited by examiner

ROBOTIC VEHICLE WITH DEFINED PATH AND SAFETY MEASURES

CROSS-REFERENCE TO RELATED APPLICATIONS

This application is a National Stage application of International Patent Application No. PCT/EP2017/081727, filed on Dec. 6, 2017, which claims priority to Danish Patent Application No. PA 2016 00770 filed Dec. 19, 2016 each of which is hereby incorporated by reference in its entirety.

TECHNICAL FIELD

The present invention relates to a robotic vehicle operated to move along a defined path, where the vehicle could be for mowing the lawn or for agricultural purposes having an operational part operating on an irregular surface. The control of the vehicle includes safety means to check that the vehicle seems to have left its path unintended.

BACKGROUND

When autonomously moving vehicles operate in environments where it may encounter living beings it is essential to ensure safety. This is especially relevant when the vehicle has operational means that potentially may make significant damage, such as the cutters of a lawn mower. This is even more relevant when the vehicle is of a large scale such as having dimensions comparable to a car with a length and width in the range of meters.

When the vehicle is controlled to a defined path through data received from a position recognition system (GPS etc.) it may of some reason receive wrong information on its actual position, and thus being directed to positions where it may risk doing damage to living beings, objects and/or itself.

SUMMARY

The object of the present invention is to ensure that a vehicle running under the control of a position recognition system to be running along defined path will not diverge substantially from this defined path without this being discovered, even though it appears to be on track according to the position recognition system.

The object is solved by introducing an additional safety control of the vehicle including data being independent on the position recognition system, as it is given in the claims.

The solution includes the robotic vehicle being operated through a position recognition system to direct it to a defined next position, where the path to said next position is associated with an expected behaviour of said vehicle, where the vehicle further comprises means for measuring an actual behaviour of said vehicle said means being positioned on said vehicle and being independent of said position recognition system, and a controller comparing the actual behaviour to the expected behaviour when the vehicle reaches within a define distance to said next position. The vehicle thus follows a track, or defined path, from a present position to a next defined position, where this position may be defined when the vehicle passes the present position and its expected behaviour along the path to the next defined position may be defined here. When the vehicle reaches at least within a given distance to said next defined position, this will be the new present position, and a next position defined in a repeating process.

In an embodiment, wherein a path is defined including a plural of positions each associated to an expected behaviour of the vehicle in its movement from a previous position. Thus, the path could be pre-defined before starting the vehicle, or when reaching a position then a plural of next positions with associated behaviours may be defined.

In an embodiment, areas are defined each associated with an expected behaviour when the vehicle passes an area. This could in an embodiment be the area where the vehicle is expected to operate being divided into a plural of areas, and where movements between the areas are defined according to pre-knowledge of the topologies of the areas.

The means measuring the actual behaviour will be independent on the position recognition system in the sense that the actual measurement data itself is measured directly on the vehicle the only possible influence from the position recognition system being to associate the data to a specific position.

To process and compare the data, the controller may comprise means to store the path data, the expected behaviour for each position and/or the measured actual behaviour for each position. Further it would include any means to process the data, to communicate with the position recognition system devices and the means for measuring the actual behaviour of the vehicle.

In an embodiment, if the actual behaviour at a position differs more from the expected than specified under a deviation rule it could be an indication the actual position of the vehicle does not match the expected position, and thus a safety procedure could be activated which in one embodiment is as simple as stopping the vehicle.

In an embodiment, the controller comprises a first controller associated to the steering of the vehicle and a second controller associated to the safety procedure and including the means to store the expected behaviour for each position and the measured actual behaviour for each position, the second controller thus running independently from the first controller optionally solely being associated to this path checking safety procedure.

In an embodiment, the position recognition system comprises a first part adapted cooperate with the first controller and a second part adapted to cooperate with the second controller. The second part adapted to cooperate with the second controller providing the position input that a comparison of the actual behaviour of the vehicle is to the expected behaviour. In one embodiment, they communicate though the same position recognition device (e.g. GPS) and in an alternative embodiment they communicate through separate position recognition devices.

The position recognition system comprises the position recognition device(s), where this in an embodiment is a satellite navigation system.

Since the defined path usually is meandering frequently changing is direction the vehicle often changes its direction and velocity and thus also acceleration, therefore a natural choice for the expected behaviour of the vehicle in an embodiment includes acceleration, velocity and/or a direction of the vehicle.

In an embodiment, the expected behaviour data for a position is related to one pre-defined set of measurement data along the path, thus one measurement of actual behaviour at the position, or at least in the vicinity of the position, is related to a similar set of expected behaviour data associated to this position.

In an embodiment, each of the positions is related to the pre-defined set of measurement data along a sub-section of the path, thus for each of the positions the expected behaviour data of the vehicle is related to a plural of measurements along a sub-path of the defined path at a number of positions e.g. to give an aggregate or average number, or simply comparing each of the individual measurement actual behaviour data along the sub-section to the expected behaviour data.

The present invention further relates to the method to control a robotic vehicle, said method being to use a position recognition system to direct it to a defined next position, where the path to said next position is associated with an expected behaviour of said vehicle, where the vehicle further comprises means for measuring an actual behaviour of said vehicle said means being positioned on said vehicle and being independent of said position recognition system, and a controller comparing the actual behaviour to the expected behaviour when the vehicle reaches within a define distance to said next position.

DETAILED DESCRIPTION

Figure 1:
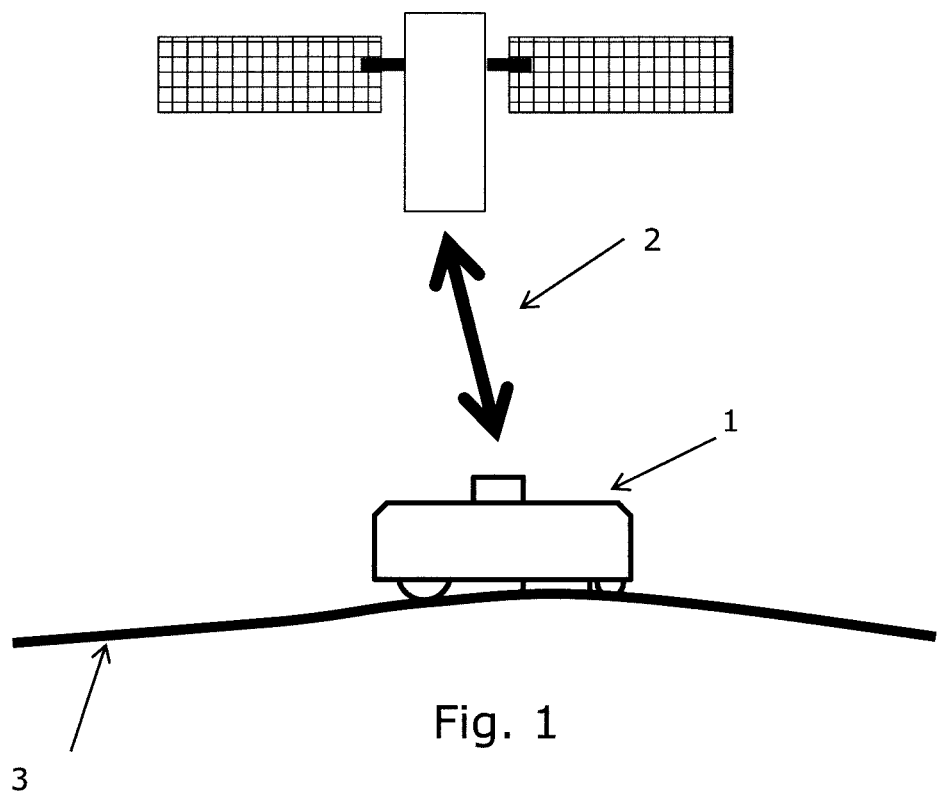
FIG. 1 A robotic vehicle operated on an irregular surface under input from a position recognition system like GPS.

FIG. 1 illustrates a robotic vehicle (1) operated through a position recognition system (2) of any kind, such as a satellite navigation system (2) like GPS, GLONASS etc.

The vehicle (1) may be an autonomously moving device having an operational part to work on an irregular surface (3), such as the ground surface. This could be a robotic lawn mower, the operational part being the cutters to cut the grass, but may also be a vehicle for agricultural purposes such as for cutting crop, harvesting in general, ploughing etc.

When the vehicle (1) is controlled according to a defined path (4) (see FIG. 2) it may be essential to ensure the vehicle (1) stays sufficiently close on this path and does not get to places where it potentially may do harm to objects, especially living beings, or even to itself. This is especially relevant for vehicles (1) e.g. like lawn mowers or for agricultural purposes having an operational part e.g. being cutting tools.

Figure 2:
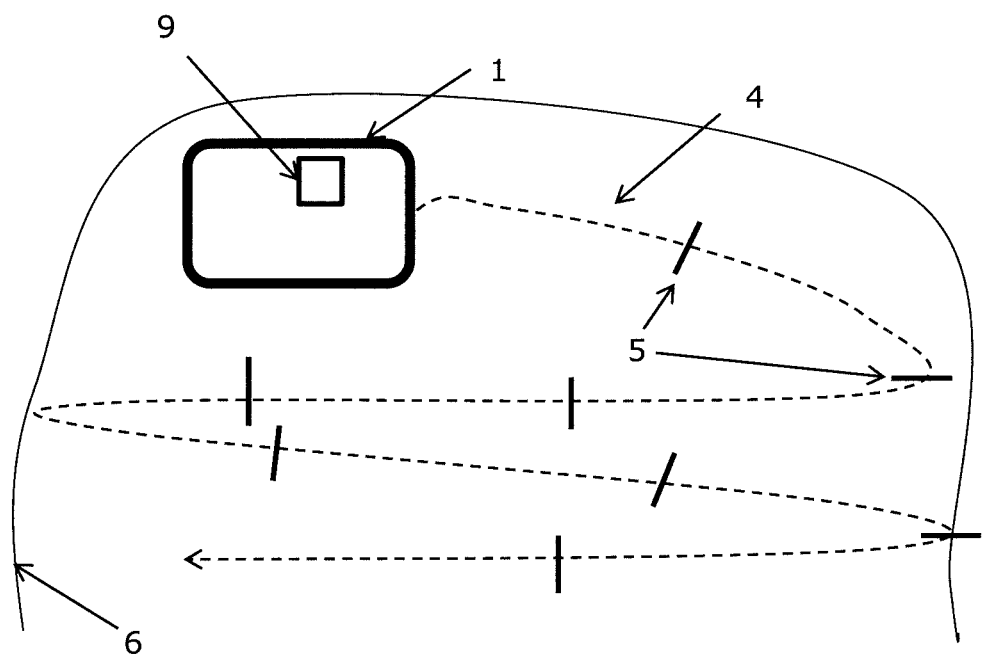
FIG. 2 A robotic vehicle being controlled along a path.

FIG. 2 illustrate the robotic vehicle (1) running along the defined path (4) that could be a path stored in a data logging system and could be produced in any possible manner like physically running the vehicle (1) along the path during some initialization process making and storing position measurements, it could also be done by plotting the path on an electronic map, or in any other manner.

Along the defined path (4) a plural of positions (5) is defined where each of the positions (5) are being associated with an expected behaviour of said vehicle (1). The positions (5) divides the path (4) into sub-sections defined between any two neighbouring positions (5) seen in relation to the expected movement of the vehicle (1) along said path (4). The expected behaviour could be an acceleration of the vehicle (1) at that position (5), such that if the actual acceleration measured at a position (5) is compared to the expectations, or the expected behaviour associated to that position (5) (e.g. an expected acceleration), and they differ more than specified under a deviation rule, then a safety procedure is activated of the vehicle (1). Alternatively, or additionally, it could be or include the velocity or any other imaginable behaviour associated to the movement of the vehicle (1).

Such a deviation rule could be anything like a fixed and defined actual difference threshold between the two values, the expected behaviour and the actual behaviour, a fixed and defined percentage difference, or could in any manner be related to the acceleration, velocity (possible including a direction of the vehicle (1)), position of the vehicle (1), a height above water level, etc., it could e.g. be a defined difference under some rule defined specifically for each of the positions (5).

In order to measure the actual behaviour, the vehicle (1) comprises means (9) able of making this measurement, such as e.g. for measuring the acceleration and/or velocity of the vehicle (1). Such devices are well known in the art e.g. accelerometers of any kind, the data being stored in the data logging means (8) (see FIG. 3) as the measured actual behaviour.

Also seen in FIG. 2 is a border (6) defining the outermost allowed edge for the movement of the vehicle (1).

Figure 3:
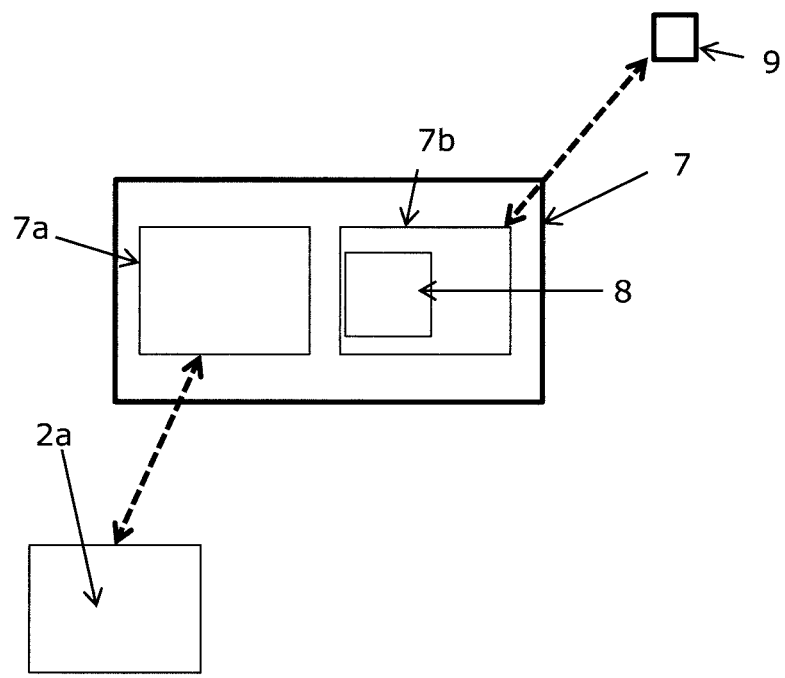
FIG. 3 A two part controlling system of an robotic vehicle in a first embodiment.

FIG. 3 illustrate the control setup of the vehicle (1) formed of a controller (7) that comprises a first controller (7a) associated to the steering of the vehicle (1) and wherein the position recognition system (2) comprises a control part (2a) adapted cooperate with the first controller (7a)

The first controller (7a) operates with the steering of the vehicle (1) to follow the defined path (4), setting its speed and direction according to the position input received from the control part (2a) of the position recognition system (2).

The controller (7) further comprises a second controller (7b) associated to the safety procedure and including the means (8) to store e.g. the expected behaviour associated with each of the defined positions (5) (optionally the position itself and/or the path data) and the measured actual behaviour for each position (5).

If they get their information independently any error arising in the one would not be inherited by the other and thus form an extra safety to the vehicle (1). If they 'agree' in the information associated with an expected position (5) the information, and thus the position, would be expected to be correct, otherwise some error may have occurred and a safety procedure may have to be initiated, such as stopping the vehicle (1).

The controller (7) may be a single controller with e.g. a processor adapted to operate as two independent controllers, the first controller (7a) and second controller (7b) or may be separate controllers/processors.

This second controller (7b) forms an additional safety to the operation of the vehicle (1). The first part (2a) of the position recognition system (2) being involved with the control and steering of the vehicle (1) may at some time e.g. give a wrong measurement of its actual position. The vehicle (1) thus could actually being directed outside the border (6) and optionally in contact with living beings etc., though the first controller (7a) expects it to be running along the defined path (4).

By introducing the second controller (7b) receiving measurements on the actual behaviour of the vehicle (1) from measuring means (9), these then can be compared to the expected behaviour at the expected position (5) of the vehicle (1). Since the defined path (4) usually is meandering frequently changing is direction the vehicle (1) often changes its direction and velocity and thus also acceleration. Also, the changes in the irregular surface (3) could influence the behaviour of the vehicle (1).

Therefore, since the measured actual behaviour is independent on the position recognition system (2), comparing the actual behaviour to the expected behaviour at a position (5), if they differs more than allowed under some rule, this would give an indication that the vehicle (1) may actually be at a different position than what was expected according to the input from the position recognition system (2), and thus a safety procedure would be activated, where this could be as simple as to stop the vehicle (1).

The defined checking positions (5) along the defined path (4) thus will be associated with expected behaviour data at one measurement position of the vehicle (1) at least in the near vicinity of the position (5), but could also be related to an set of measurements along a sub-section or the whole of the path (4), e.g. to give an aggregate or average number, or simply comparing each of the individual measurement actual behaviour data along the sub-section to the expected behaviour data.

Figure 4:
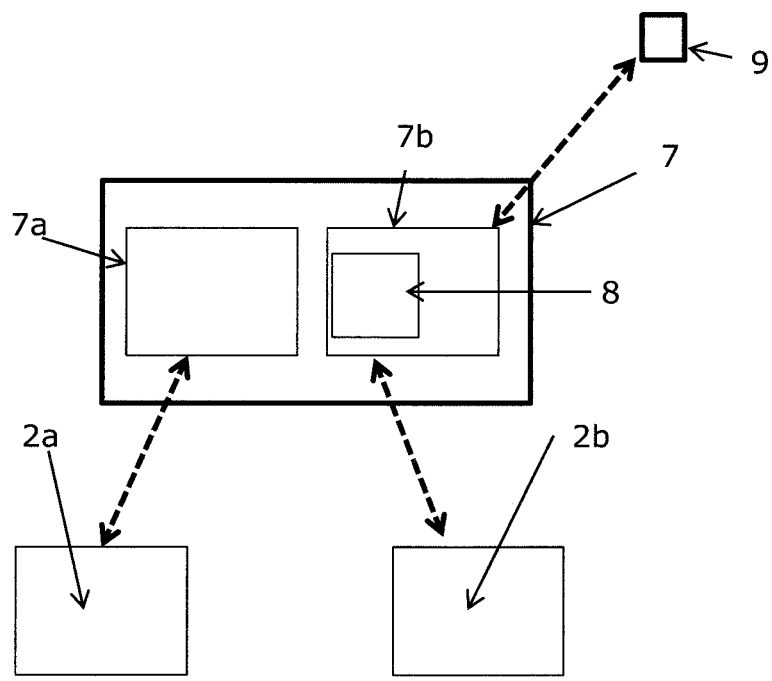
FIG. 4 A two part controlling system of an robotic vehicle in a second embodiment.

In the illustrated embodiment of FIG. 4, basically the same system as in FIG. 3 is illustrated, but with the addition that the position recognition system (2) comprises a safety part (2b) adapted to cooperate with the second controller (7b) in addition to the means (9) for measuring the actual behaviour.

The control (2a) and safety parts (2b) of said position recognition system (2) may form part of the same position recognition device, e.g. GPS, each of the first (7a) and second (7b) controllers comprising or communicating with their own separate position recognition device (GPS etc.) or they may each their own separate one, or just get the information from separate and independent paths. The may operate independently such that the safety data is independent on the operational, or control data, such that an error in the one would not be repeated in the other.

The safety part (2b) of the position recognition system (2) gives an additional information to the second controller (7b) as an additional safety information. This thus could include into the expected behaviour the expected position too, such as the vehicle (1) actually being at the position (5) at the expected time.

Figure 5:
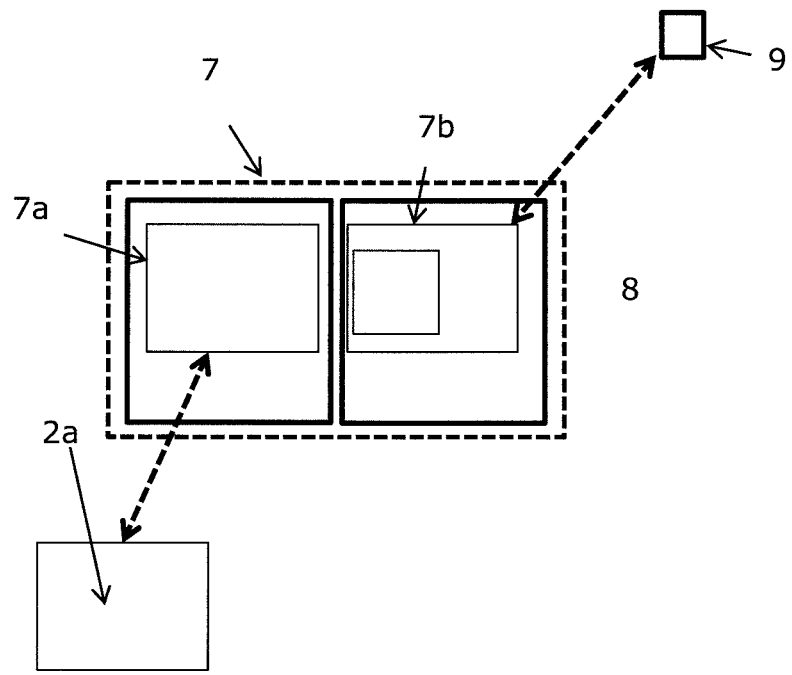
FIG. 5 A two part controlling system of an robotic vehicle in a third embodiment.
Figure 6:
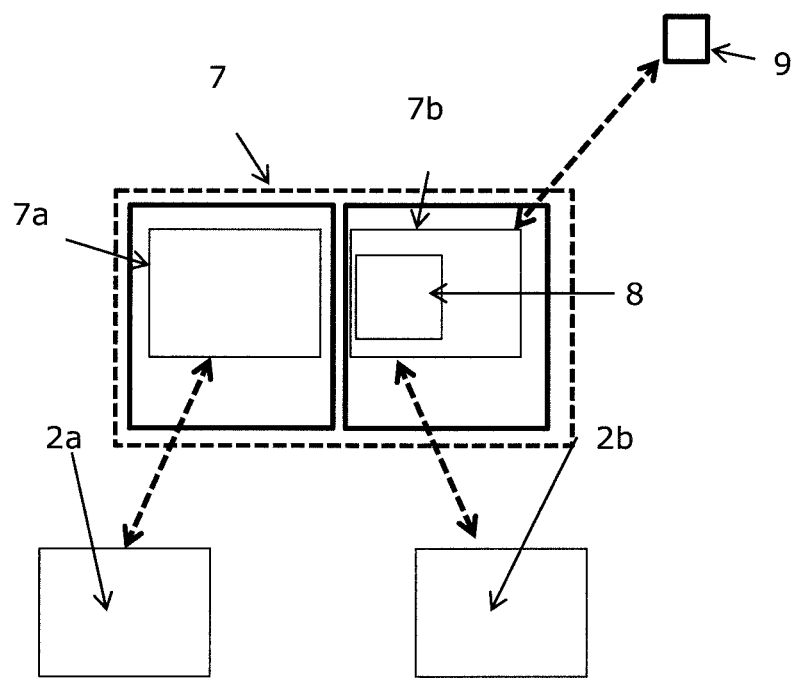
FIG. 6 A two part controlling system of an robotic vehicle in a sixth embodiment.

FIGS. 5 and 6 illustrate the same systems as FIGS. 3 and 4, only where the controller (7) is illustrated as a 'controller system' (7) formed of two independent controllers, the first controller (7a) for controlling the vehicle (1) along the path (4) and the second controller (7b) being the safety controller. The two controllers (7a) and (7b) then would operate totally independent and include their own processor(s).

Figure 7:
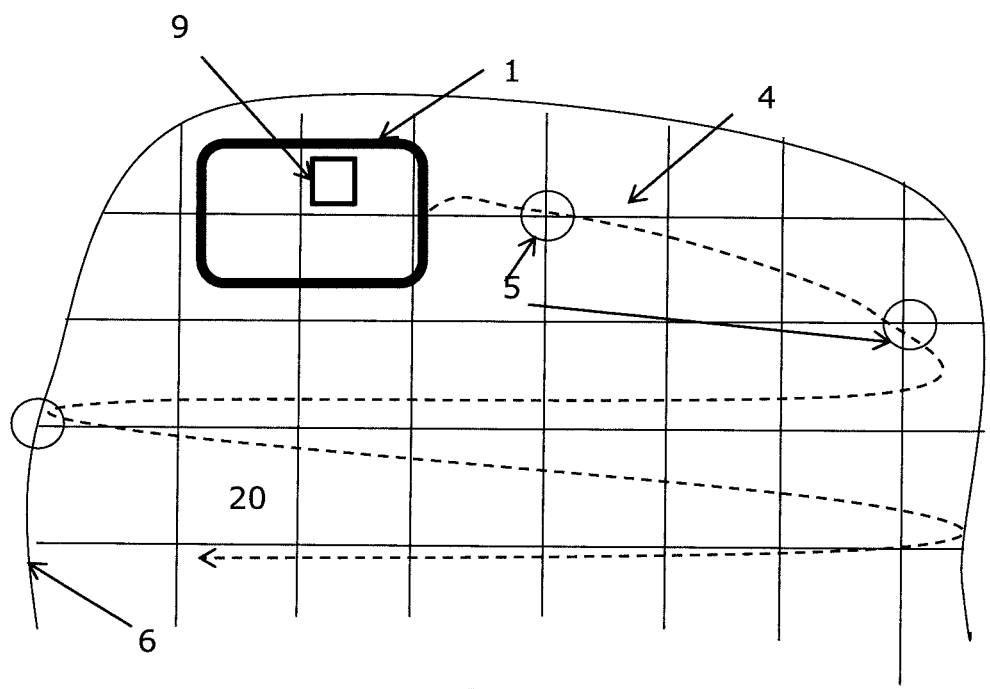
FIG. 7 A robotic vehicle being controlled within a border comprising predefined areas.

In alternative or additional embodiments the positions (5) are not related to a pre-defined path (4), but where the path (4) are to be understood as an defined area within which the movement of vehicle (1) is confined. Such an embodiment is illustrated in FIG. 7, where the vehicle (1) moves along a path (4) being confined within the area given by a border (6). Here the path (4) may be defined prior to stating the vehicle (1), or it may be generated as the vehicle (1) moves, such as by random movement, or by selection of a next section of a path (4), e.g. by selecting a next position (5) being a target position.

The positions (5) then rather than being given in relation to a path (4) then is linked to actual pre-defined positions (5) in the area as defined by border (6), such as in one embodiment to be positioned in a grid, though it could also be distributed over the area in any other manner, such as by taking the area topology into account.

As the vehicle (1) moves it then reaches within a defined distance to position, this giving rise to a new comparison of the expected behavior to the actual measured behavior of the vehicle (1) since the last check. All these expected behavior's then possible could be associated and pre-defined according to the areas (20) defined by the grid. This could in one embodiment be that each area (20) then have some known topology, thus when the vehicle (1) crosses an area (20) an expected behavior can be calculated based e.g. on the expected path between to positions (5) and the topology of the areas it passes. This then forms the expected behavior to be compared to the actual behavior.

This embodiment would also allow the vehicle (1) not to follow a path (4) that can be given during its movement. In this embodiment, once the vehicle (1) reaches a defined position (5) (or at least within a given distance of the position (5)), a next position (5) could be defined, possible by 'random' selection. The pre-defined path (4) as described in relation to FIG. 2 thus could be related to only the section between the present and the next defined position (5), thus 'pre-defined' related to being defined at this stage, and the expected behavior calculated at this stage, such as based on a known topology. In an alternative embodiment, the path (4) as such is not defined, but the as the vehicle (1) passes the areas (20) as described in relation to FIG. 7, these areas (20) will define the expected behavior.

Figure 8:
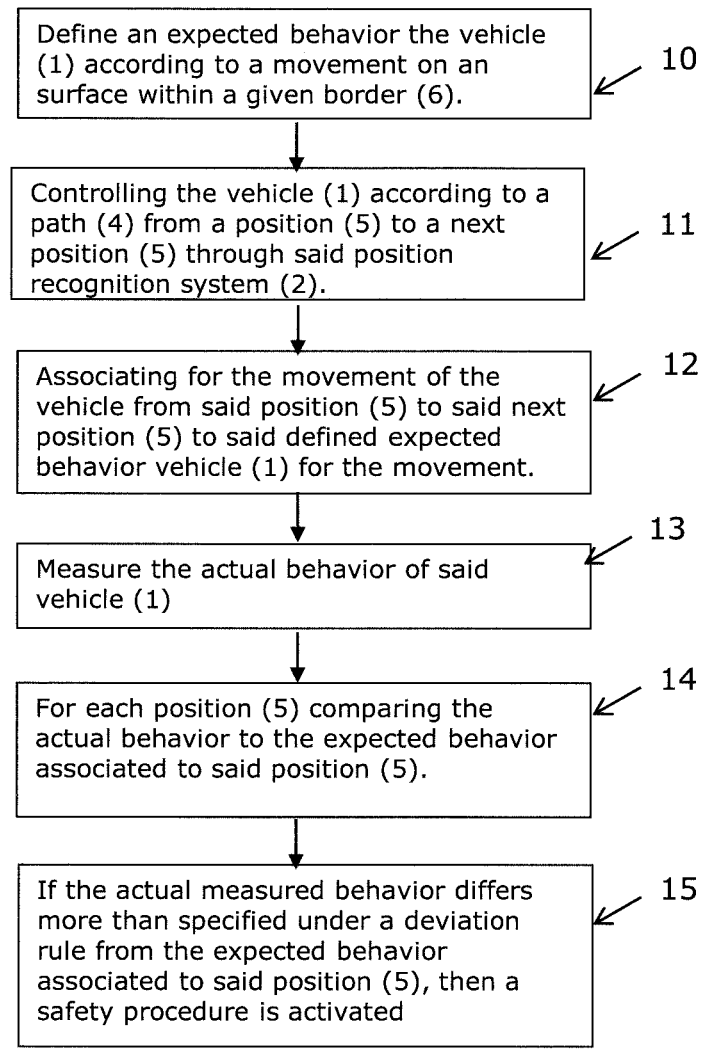
FIG. 8 A flow chart illustrating the method of the safety procedure in the control of the vehicle.

The present invention further relate to control the vehicle (1) through a position recognition system (2), where an embodiment is illustrated in FIG. 8. The method includes:

A step (10) being to define an expected behaviour the vehicle (1) according to a movement on a surface within a given border (6).

This expected behaviour could be associated with a defined path (4) or with defined areas (20) according to the previously described embodiments.

The method further includes step (11) of controlling the vehicle (1) according to a path (4) from a position (5) to a next position (5) through said position recognition system (2).

A step (12) of associating for the movement of the vehicle from said position (5) to said next position (5) to said defined expected behavior vehicle (1) for the movement.

A step (13) of measuring the actual behavior of said vehicle (1).

A step (14) of each position (5) comparing the actual behavior to the expected behavior.

A step (15) where if the actual measured behavior differs more than specified under a deviation rule from the expected behavior, then a safety procedure is activated.

In an embodiment, said expected behaviour of said method includes an acceleration, velocity, a position and/or a direction.

In an embodiment of the method said behaviour at a position (5), expected and actual, is related to a set of measurement data along the path (4), such as along a sub-section of the path (4) between said positions (5) and the previous position (5) along the path (4).

In an embodiment of the method said behaviour at a position (5), expected and actual, is related to said behaviour at said position (5).

In one further embodiment, the robotic vehicle (1) is comprises means and is adapted to operate in robotic mode according to the previously described embodiments, or in human controlled mode. The means for the human controlled mode may include e.g. a seat and steering means like a joystick, a steering wheel etc. In one associated embodiment, the system, such as the controller (7), remembers which of the positions (5) that have been 'visited' in e.g. the human controlled mode, and thus excludes these from the next run in the robotic mode.

In this manner, e.g. areas comprising trees, where pools of water may appear and disappear, could be managed in a human controlled mode, whereas the rest then subsequently could be managed in the robotic mode.

In one embodiment, the positions (5) are 'excluded' does not imply the robotic vehicle (1) would not cross these positions (5), as this may be required when moving between 'unvisited' positions (5), but only that these does not form part of the positions (5) to be managed by the robotic vehicle (1). In an alternative or additional embodiment, all or some of the positions (5) is totally removed and thus will not be visited by the robotic vehicle (1) when in robotic mode.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A robotic vehicle operated through a position recognition system and controlled according to a defined next position by said position recognition system, where the vehicle further comprises means for measuring an actual behavior of said vehicle, and a controller comparing the actual behavior to an expected behavior when the vehicle reaches within a defined distance to said next position, wherein defined areas crossed by the vehicle on a path to said next position are each associated with the expected behavior of said vehicle, wherein the means for measuring the actual behavior is positioned on the vehicle, generates measured actual behavior data and is independent of the position recognition system except from associating the measured actual behavior data to a specific position, wherein a safety procedure is activated if the measured actual behavior of the vehicle for an associated area differs from the expected behavior of the vehicle for said associated area more than specified under a deviation rule, wherein the position recognition system is configured to control the vehicle for movement only within the confines of a defined border, wherein a defined path is initially produced by physically running the vehicle and storing position measurements, and wherein the expected behavior includes an acceleration.

2. The robotic vehicle according to claim 1, wherein the controller comprises means to store data, including path data, the expected behavior data and/or the measured actual behavior data.

3. The robotic vehicle according to claim 2, wherein the controller comprises a first controller associated to the steering of the vehicle and a second controller associated to the safety procedure and including the means to store the expected behavior data for each position and the measured actual behavior data for each position.

4. The robotic vehicle according to claim 3, wherein the position recognition system comprises a control part adapted to cooperate with the first controller and a safety part adapted to cooperate with the second controller.

5. The robotic vehicle according to claim 4, wherein each of the control and safety parts of said position recognition system comprises a satellite navigation system.

6. The robotic vehicle according to claim 4 wherein the position recognition system comprises a satellite navigation system.

7. The robotic vehicle according to claim 3 wherein the position recognition system comprises a satellite navigation system.

8. The robotic vehicle according to claim 2 wherein the position recognition system comprises a satellite navigation system.

9. The robotic vehicle according to claim 2, wherein the expected behavior includes a velocity.

10. The robotic vehicle according to claim 1 wherein the position recognition system comprises a satellite navigation system.

11. The robotic vehicle according to claim 10, where the expected behavior further includes a direction.

12. The robotic vehicle according to claim 11, wherein the vehicle comprises means for measuring the acceleration and/or velocity of the vehicle, the acceleration and/or velocity data being stored in data logging means as the measured actual behavior.

13. The robotic vehicle according to claim 1, wherein the expected behavior includes a velocity.

14. The robotic vehicle according to claim 13, wherein the vehicle comprises means for measuring the acceleration and/or velocity of the vehicle, the acceleration and/or velocity data being stored in data logging means as the measured actual behavior.

15. The robotic vehicle according to claim 1, wherein the robotic vehicle is a mowing vehicle with one or more cutters for mowing or an agricultural vehicle with one or more operating parts for agricultural purposes.

16. The robotic vehicle according to claim 1, wherein the safety procedure comprises stopping the robotic vehicle.

17. The robotic vehicle according to claim 1, wherein the controller is configured to store positions visited by the robotic vehicle and exclude the stored positions visited during a future run of the robotic vehicle.

18. The robotic vehicle according to claim 1, wherein the controller is configured to store positions visited by the robotic vehicle during a human controlled mode run of the robotic vehicle and to exclude the stored positions visited during a future robotic controlled run of the robotic vehicle.

19. A method to control a vehicle through a position recognition system including:
   a step of defining an expected behavior of the vehicle according to a movement on a surface within a defined border, where said expected behavior is associated with a defined path,
   a step of controlling the vehicle according to the defined path from an actual position to a next position through said position recognition system,
   a step of associating the movement of the vehicle from said actual position to said next position to said defined expected behavior,
   a step of measuring the actual behavior of said vehicle by means for measuring the actual behavior positioned on the vehicle and independent of the position recognition system except from associating measured actual behavior data to a specific position,
   a step of comparing, for each actual position, the actual behavior to the expected behavior,
   a step of activating a safety procedure if the actual measured behavior differs more than specified under a deviation rule from the expected behavior, wherein the position recognition system is configured to control the vehicle for movement only within the confines of the defined border, wherein a defined path is initially produced by physically running the vehicle and storing position measurements, and wherein the expected behavior includes an acceleration.

* * * * *